US008093164B2

(12) United States Patent
Richter et al.

(10) Patent No.: US 8,093,164 B2
(45) Date of Patent: Jan. 10, 2012

(54) HIGH TEMPERATURE RESISTANT INORGANIC FIBRE BASED ON SILICA AND PROCESS FOR PRODUCING THE SAME

(75) Inventors: Robin Richter, Freiberg (DE); Folker Steden, Dresden (DE); Sven Lehr, München (DE)

(73) Assignee: Belchem Fiber Materials GmbH, Freiberg (DE)

( * ) Notice: Subject to any disclaimer, the term of this patent is extended or adjusted under 35 U.S.C. 154(b) by 0 days.

(21) Appl. No.: 12/668,795

(22) PCT Filed: Jul. 7, 2008

(86) PCT No.: PCT/DE2008/001123

§ 371 (c)(1), (2), (4) Date: Jun. 29, 2010

(87) PCT Pub. No.: WO2009/006882

PCT Pub. Date: Jan. 15, 2009

(65) Prior Publication Data

US 2010/0298110 A1 Nov. 25, 2010

(30) Foreign Application Priority Data

Jul. 12, 2007 (DE) ......................... 10 2007 032 391

(51) Int. Cl.
*C03C 13/02* (2006.01)
*C03C 13/00* (2006.01)
*C03B 37/02* (2006.01)

(52) U.S. Cl. ................. 501/38; 501/35; 501/36; 65/476

(58) Field of Classification Search .................... 501/35, 501/36, 95.1, 95.2, 38, 54, 68; 65/376, 385, 65/476

See application file for complete search history.

(56) References Cited

U.S. PATENT DOCUMENTS

| | | | | |
|---|---|---|---|---|
| 2,491,761 | A | 12/1949 | Parker et al. | |
| 2,494,259 | A | 1/1950 | Nordberg | |
| 2,718,461 | A | 9/1955 | Parker at al. | |
| 3,687,850 | A | 8/1972 | Gagin | |
| 4,778,499 | A * | 10/1988 | Beaver | 65/390 |

(Continued)

FOREIGN PATENT DOCUMENTS

DE 197 24 874 A1 11/1998

(Continued)

OTHER PUBLICATIONS

International Preliminary Report on Patentability for International Appl. No. PCT/DE2008/001123 (Translated), European Patent Office, completed Oct. 8, 2009, 7 pgs.

(Continued)

*Primary Examiner* — Jerry A Lorengo
*Assistant Examiner* — Lynne Edmondson
(74) *Attorney, Agent, or Firm* — Sterne, Kessler, Goldstein & Fox P.L.L.C.

(57) ABSTRACT

The present invention relates to a high-temperature resistant inorganic fiber which is based on silica and has improved mechanical properties, a process for producing it and also specific uses thereof and products derived therefrom. The fiber of the invention has the following composition: 81-94% by weight of $SiO_2$, 6-19% by weight of $Al_2O_3$, 0-12% by weight of $ZrO_2$, 0-12% by weight of $TiO_2$, 0-3% by weight of $Na_2O$ and not more than 1.5% by weight of further components.

24 Claims, 1 Drawing Sheet

U.S. PATENT DOCUMENTS

Figure 1:
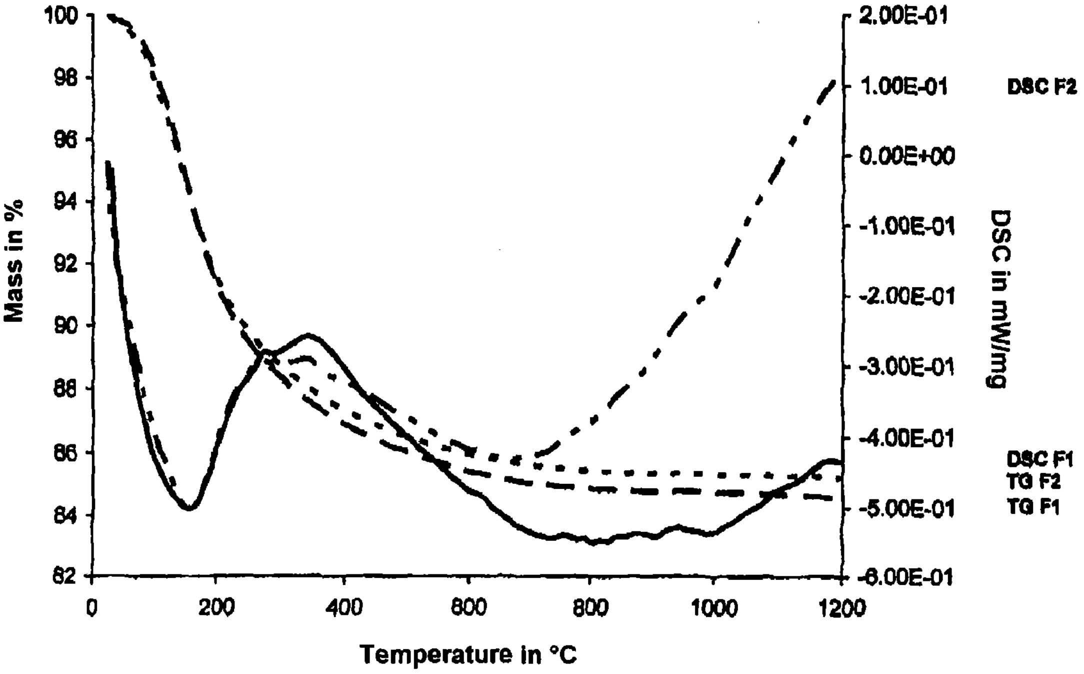

| | | | | |
|---|---|---|---|---|
| 5,302,444 | A * | 4/1994 | Jackson et al. | 428/426 |
| 6,374,641 | B1 * | 4/2002 | Chu et al. | 65/385 |
| 6,953,757 | B2 * | 10/2005 | Zoitos et al. | 501/35 |
| 2003/0220183 | A1 * | 11/2003 | Kurachi et al. | 501/70 |
| 2008/0153068 | A1 * | 6/2008 | Kessler et al. | 433/217.1 |

FOREIGN PATENT DOCUMENTS

| | | | |
|---|---|---|---|
| DE | 298 23 432 | U1 | 6/1999 |
| EP | 236 735 | A1 | 9/1987 |
| EP | 0 510 653 | A1 | 10/1992 |
| GB | 976 565 | | 11/1964 |
| LU | 41 799 | A1 | 7/1962 |
| WO | WO 2007/035131 | A2 | 3/2007 |

OTHER PUBLICATIONS

International Search Report for International Appl. No. PCT/DE2008/001123 (Translated), European Patent Office, mailed Nov. 26, 2008.

Matsuno, K., "Heat-Resistant Porous Alumina-Silica Fibers," Chemical Abstracts, American Chemical Society, vol. 109, No. 2, p. 261 (Jul. 11, 1988).

Unverified English language abstract for European Patent No. EP 236 735 A1, Schmidt, et al., espacenet Database, European Patent Office (1987).

* cited by examiner

HIGH TEMPERATURE RESISTANT INORGANIC FIBRE BASED ON SILICA AND PROCESS FOR PRODUCING THE SAME

The present invention relates to a high temperature resistant inorganic fiber based on silica having improved mechanical properties, a process for producing same, specific uses thereof and products made therefrom.

There is a multiplicity of inorganic fibers in the high temperature segment. Examples are, among others, Silex® fibers, silica fibers, glass fibers, ceramic fibers, bio-soluble fibers, polycrystalline fibers and quartz fibers. These high temperature resistant fibers are practically present in all areas of life in which high temperatures have to be mastered. They are applied in all industries, from large-scale commercial plants such as smelting of metallic ores, steel and aluminum production, industrial furnace construction, aviation and space travel, fire protection in buildings, to reinforcement of plastics and concretes, household appliance technology, and in emission control systems of the automobile and commercial vehicle industry.

In modern high-tech applications, besides the function of high-temperature thermal protection and insulation, inorganic fibers frequently also have to accomplish further tasks that strongly depend on their mechanical characteristics. As example, reinforcing fibers may be mentioned that besides their functionalized surface for better connection to the medium surrounding them should preferably simultaneously have high tensile strengths. As a specific example, inorganic fibers that are used in mounting mats for monoliths in exhaust systems of the automobile industry have to exhibit for example besides good thermal insulation properties up to 1100° C. also sufficient flexibility to still demonstrate an appropriate holding power with changing gap sizes. Many fiber materials are further processed in subsequent textile processes such as yarning, twisting, weaving, knitting, etc. into textile products. Here, the mechanical characteristics are also of great importance, for example to avoid tearing in twisting or weaving processes.

Regarding the manufacture of high temperature resistant inorganic fibers, there is a large variety of possibilities to produce high temperature resistant, inorganic, oxidic, amorphous or polycrystalline fibers. The classical mineral fibers comprise as main ingredient $SiO_2$ and $Al_2O_3$, with weight percentages of $Al_2O_3$ of more than 40% by weight. In addition, depending on the intended field of application there are chemical compositions comprising additionally alkali oxides and alkaline earth oxides such as $Li_2O$, $Na_2O$, $K_2O$, MgO, CaO and transition metal oxides such as $TiO_2$, $ZrO_2$ and $Y_2O_3$. It is roughly differentiated between aluminum silicate fibers or RCFs (refractory ceramic fibers), high-temperature glass fibers, AES (bio-soluble fibers), polycrystalline fibers, fibers produced via sol-gel processes, and silicate fibers.

In principle, three processes of fiber production are used. If the heterogeneous mixture of rocks can be cost-effectively melted, the melt is supplied via a channel to the so-called spinner, a rotating disk, where by means of a rotary spinning process fibers are drawn by tangential deflection of the melt droplets. The nature of this process allows only limited control over the fiber diameter. Moreover, the raw fiber contains a not insubstantial amount of non-fiberized material, so-called shots, that have to be removed in costly manner in subsequent process steps. If the starting batch can only be liquefied at extremely high temperatures, as is the case with mixtures having a high $Al_2O_3$ content of >63% by weight, sol-gel processes are used. In this very costly process, fibers are formed by extruding aqueous metalorganics-containing spinning gel or colloidal $SiO_2$ or $Al_2O_3$ spinning solutions through spinnerets, the fibers being baked in a subsequent thermal treatment step. An elegant method to obtain high temperature resistant amorphous fibers with high silicon dioxide content is the treatment of alkali metal-rich low-melting glass precursors produced by the platinum glass melting tank-drawing drum process with acid. Through the acid-induced, diffusion-controlled ion exchange process, fibers having a $SiO_2$ content of more than 99% can be obtained. In the process, monovalent alkali metals such as Li, Na and K are mostly fully, divalent alkaline earth metals are only partially, and trivalent metals (with the exception of boron) such as aluminum are only in traces replaced in the silicon dioxide framework by protons of the acid.

It is described in several patents (U.S. Pat. No. 2,494,259, EP 510 653, GB 976 565, EP 236 735, U.S. Pat. No. 2,718, 461) that by acid treatment of an amorphous network of silicon dioxide interspersed with metal atoms, it can be made more temperature resistant.

In the methods listed above, glass fiber is usually introduced into the acid in random fashion in the form of bulk material, felts or mats, and subsequently purified by removing residual acid and the salt resulting from the reaction by rinsing with water. In this method, exceeding the solubility products, which cannot be controlled, frequently results in damage of the fiber on the fiber surface, in the form of salt and siliceous deposits, which leads to a drastic reduction of the mechanical characteristics (tensile strength, breaking load, elasticity, etc). The method described in the earlier patent EP 0 973 697 of acid extraction of staple fiber yarns on yarn tubes is better suitable. Here, in a Pt—Rh bushing a glass precursor having high alkali metal content and 1-5% by weight of $Al_2O_3$ is melted, and staple fibers are produced using the drawing drum method. In the process, the fibers, through which in a second step organic or inorganic acid is rinsed, are wound. The acid starts a diffusion-controlled ion exchange process in which metallic atoms that are able to detach from the structure are replaced by protons. Subsequently, the fiber is dried in a drying unit. This gentle method allows for the production of staple fiber slivers that can be used in temperature ranges of up to 1250° C.

Table 1 below shows a summary of chemical compositions of inorganic, high temperature resistant, oxidic fibers used at present. All specifications are given in percent by weight.

TABLE I

| Component | Silex ® | E glass | A glass | C glass | ECR glass | R glass | S glass | D glass | Alkali-resistant | Quartz fiber |
|---|---|---|---|---|---|---|---|---|---|---|
| $SiO_2$ | 95-97 | 53-55 | 70-72 | 60-65 | 58 | 60 | 60-65 | 73-74 | 65-71 | 99-100 |
| $Al_2O_3$ | 3-5 | 14-16 | 0-2.5 | 2-6 | 12-13 | 25 | 20-25 | <1 | <1 | <1 |
| CaO | <1 | 20-25 | 5-9 | 14 | 21 | 6 | <1 | <1 | 4-8 | <1 |
| MgO | <1 | 20-25 | 1-4 | 1-3 | 4-5 | 9 | 10 | <1 | <1 | <1 |
| $B_2O_3$ | <1 | 6-9 | 0-0.5 | 2-7 | <0.1 | <1 | <1 | 22-23 | <1 | <1 |
| $Na_2O$ | <1 | <1 | 12-15 | 8-10 | 0.6 | <1 | <1 | 1.3 | 11-21 | <1 |

TABLE I-continued

| | | | | | | | | | | |
|---|---|---|---|---|---|---|---|---|---|---|
| $K_2O$ | <1 | <1 | 1 | <1 | 0.4 | <1 | <1 | 1.5 | <3 | <1 |
| $ZrO_2$ | <1 | <1 | <1 | <1 | 0.3 | <1 | <1 | <1 | 7-18 | <1 |
| $TiO_2$ | <1 | <1 | <1 | <1 | 2.1 | <1 | <1 | <1 | 4-12 | <1 |

| Component | AES bio-sol. | RCF | High alumina sol-gel | ceramic fiber | Mullite fiber polycryst. | Boron-containing fibers | $ZrO_2$—$SiO_2$ fiber | Silica fibers |
|---|---|---|---|---|---|---|---|---|
| $SiO_2$ | 60-80 | 32-36 | 4-15 | 50-60 | 10-20 | 24-28 | 32 | 95-99 |
| $Al_2O_3$ | <5 | 44-48 | 85-96 | 40-50 | 80-90 | 62-70 | <1 | 1-4 |
| CaO | 0-30 | <1 | <1 | <1 | <1 | <1 | <1 | <1 |
| MgO | 5-20 | <1 | <1 | <1 | <1 | <1 | V | <1 |
| $B_2O_3$ | <1 | <1 | <1 | <1 | <1 | 2-14 | <1 | 0-5 |
| $Na_2O$ | <1 | <1 | <1 | <1 | <1 | <1 | <1 | <1 |
| $K_2O$ | <1 | <1 | <1 | <1 | <1 | <1 | <1 | <1 |
| $ZrO_2$ | <1 | 15-23 | <1 | <1 | <1 | <1 | 64 | <1 |
| $TiO_2$ | <1 | <1 | <1 | <1 | <1 | <1 | <1 | <1 |

Due to the diverse demands made on modern fibers regarding on the one hand high temperature resistance, and on the other hand good mechanical properties such as tensile strength, breaking load, elasticity, etc., there is still a need for fibers with improved properties despite the multiplicity of fibers available so far.

It is therefore the object of the present invention to provide high temperature resistant inorganic fibers based on silica, which have improved mechanical properties in comparison to the high temperature resistant inorganic glass fibers known so far.

The object is solved by a high temperature resistant inorganic fiber based on silica in accordance with claim 1, a process for producing such fibers in accordance with claim 9, uses thereof in accordance with claim 12 and claim 13, and fiber products in accordance with claim 14 to claim 16.

According to the invention, a high temperature resistant inorganic fiber based on silica is provided, said fiber having the following composition:

81-94% by weight of $SiO_2$
6-19% by weight of $Al_2O_3$
0-12% by weight of $ZrO_2$
0-12% by weight of $TiO_2$
0-3% by weight of $Na_2O$ and a maximum of 1.5% by weight of further components.

The further components can be for example $Li_2O$, $K_2O$, CaO, MgO, SrO, BaO, all transition metal oxides such as in particular $Y_2O_3$ and $La_2O_3$ and $Fe_2O_3$, or coloring metal ions.

The fiber according to the invention is a high temperature resistant, inorganic, amorphous, non-hazardous to health fiber based on a metastable network of silicon dioxide modified with the aid of metallic foreign atoms (aluminum and optionally zirconium and/or titanium). High temperature resistant means here that an individual fiber has a tensile strength different from zero after temperature treatment for at least two hours at least 1100° C., preferably up to 1200° C., and most preferably up to about 1250° C.

Surprisingly, it was found that the amorphous network can be selectively manipulated by foreign atoms aluminum and optionally zirconium and/or titanium, and the mechanical properties can be improved.

It can be proven that doping of the amorphous $SiO_2$ network hinders the transfer of the metastable phase into the energetically more favorable, symmetrical crystalline phase. Surprisingly, it could be shown that the mechanical characteristics such as modulus of elasticity, elasticity, tensile strength, elongation, breaking load, flexibility, etc. of the monofilaments have a strong dependency on the doping level of the metallic and transition metallic network-forming foreign atoms. The weight percentages of aluminum, zirconium and titanium listed above have proven to be particularly suitable. The doping level therefore allows the adjustment of the mechanical characteristics desired in the subsequent application.

Particularly good mechanical properties, such as increasing the tensile strength of a monofilament at 1100° C. by 50-100% compared to a fiber described in the earlier patent EP 0 973 697, could be obtained with a content of about 6-13% by weight of $Al_2O_3$, more preferably with a content of about 8-13% by weight of $Al_2O_3$, and most preferably with a content of about 8-11% by weight of $Al_2O_3$.

Preferred ranges for zirconium oxide and titanium oxide are about 2-9% by weight of $ZrO_2$ and/or about 2-9% by weight of $TiO_2$, with ranges of about 3-7% by weight of $ZrO_2$ and/or about 3-7% by weight of $TiO_2$ resulting in fibers having particularly favorable mechanical properties.

Concerning the sodium oxide content, it is advantageous with regard to high temperature resistance if the content is as low as possible. A range of about 0-2% by weight of $Na_2O$ is therefore preferred, and a range of about 0-1% by weight of $Na_2O$, in particular about 0-0.5% by weight of $Na_2O$, is particularly preferred.

The fibers according to the invention can be present both in the form of filaments and in the form of staple fibers.

The fiber diameter of the fibers according to the invention is preferably from 3 to 40 μm, in particular from 6 to 25 μm.

Particularly preferred high temperature resistant inorganic fibers based on silica have after temperature treatment for two hours at 1100° C. the following properties:

Elongation [%]=1.4-1.6
E modulus [GPa]=45-53
Breaking load [mN]=20-25
Tensile strength [MPa]=600-750

The measured fibers had an average diameter of 6.5 μm+/−0.5 μm.

More preferred are fibers that can be obtained by acid extraction of a starting glass composition having the following composition:

55-80% by weight of $SiO_2$
5-19% by weight of $Al_2O_3$
15-26% by weight of $Na_2O$
0-12% by weight of $ZrO_2$
0-12% by weight of $TiO_2$ and a maximum of 1.5% by weight of further components.

Particularly preferred are starting glass compositions comprising 60 to 73% by weight of $SiO_2$, 5 to 12% by weight of $Al_2O_3$, 20 to 26% by weight of $Na_2O$, 0 to 7% by weight of $ZrO_2$, 0 to 7% by weight of $TiO_2$, and a maximum of 1.5% by weight of further components.

The chemico-physical properties of the product fiber are also affected by the production process. Production by acid extraction of the starting glass composition mentioned above, in which the alkali metal oxide is essentially removed, leads to an unusually high temperature resistance and particularly good mechanical characteristics.

The present invention is also aimed at a process for producing high temperature resistant inorganic fibers based on silica as described above, said process comprising the following steps:

a) melting a starting glass composition having the following composition:

55-80% by weight of $SiO_2$ 5-19% by weight of $Al_2O_3$ 15-26% by weight of $Na_2O$ 0-12% by weight of $ZrO_2$ 0-12% by weight of $TiO_2$ and a maximum of 1.5% by weight of further components;

b) forming filaments or staple fibers from the melt in step a);

c) acid extraction of the filaments or staple fibers obtained in step b);

d) rinsing the extracted filaments or staple fibers from step c) to remove residual acid and/or salt residues; and e) drying the filaments or staple fibers obtained in step d).

The acid treatment in step c) of the process can be performed with both an organic acid and an inorganic acid, and is in particular performed with hydrochloric acid, sulfuric acid, nitric acid or phosphoric acid, or acetic acid, formic acid or oxalic acid.

The temperature during acid treatment is preferably from 35 to 80° C., more preferably from 45 to 65° C. The duration of the wet chemical process depends on the desired degree of purity, in particular the concentration of alkali metal atoms required for temperature stability, of the fiber to be produced. To obtain maximum temperature resistance, the reaction should be performed for no less than 8 hours. Regarding the acid treatment, it is also referred to the conditions described in the earlier patent EP 0 973 697.

Rinsing in step d) occurs preferably with water until residual acid or salt residues are no longer detectable.

Regarding the drying in last step e), it is preferably performed at 100 to 130° C., most preferably at about 120° C. Particularly preferably, the fiber is dried by means of RF drying (radio frequency drying) since hereby the surface properties of the fiber are particularly advantageously affected.

For example, a low-melting glass precursor is liquefied in a platinum-rhodium glass melting tank, and subsequently by drawing the melt in the form of glass filaments or staple fibers taken up on winders or rotating drums. In a subsequent ion exchange process in an acid bath, the network-modifying cations are replaced by protons, and hence the final properties of the fibers are produced. It has become apparent that the devitrification limit of the amorphous solid can be shifted to higher temperatures by doping the $SiO_2$ network with transition metals such as titanium or zirconium and by varying the aluminum content.

In the process according to the invention, raw glasses having a $Na_2O$ content of at least 15% by weight but no more than 26% by weight, a $SiO_2$ content between 55% by weight and 80% by weight, an $Al_2O_3$ content of 5 to 19% by weight, and a content of the transition metals $ZrO_2$ and $TiO_2$ of up to 12% by weight are used. In the acid treatment, the ions $Al^{3+}$, $TiO^{2+}$ or $Ti^{4+}$, and $ZrO^{2+}$ or $Zr^{4+}$ remain in the Si—O network. The alkali metal ions are almost completely replaced by the protons of the acid. From this, possible chemical compositions of the fiber according to the invention after the ion exchange process as listed above result.

Surprisingly, it could be found that the metal ions remaining in the amorphous network after the ion exchange process affect the mechanical, chemical and physical properties in such a way that they function as inhibitors of the recrystallization tendency of silica, or for example positively modify tensile strengths of monofilaments. An additional possibility to affect the mechanical properties of the fibers produced in the manner described includes a temperature treatment of the material following the ion exchange process. The metal ions replaced by protons in the silicon dioxide framework leave, depending on valency, a certain number of hydroxyl group behind that function as terminal points of the network. These hydroxyl groups can release so-called chemically bound water by eliminating $H_2O$ with simultaneous formation of new Si—O—Si bonds. This closing of the amorphous network effects a drastic decrease of the elongation accompanied by a significant increase of the modulus of elasticity (see e.g. Table 2 below).

Finally, the present invention relates to the use of high temperature resistant inorganic fibers based on silica as described above for producing high tensile strength yarns, and for producing mounting mats for catalysts and further products made from the high temperature resistant inorganic fibers according to the invention.

Particularly preferred products are staple fibers and the high tensile strength yarns already mentioned, twisted yarns (staple fiber and filament yarns), nonwovens, woven fabrics, webs, packages, and knitted fabrics. Preferred products are for example mounting mats in emission control systems of the automobile and commercial vehicle industry, products for applications in furnace construction and in the fire protection industry (fire curtains, fireproof covers for the seats in all transportation means, etc.), and personal protective equipment.

The invention is now described in more detail with regard to the following examples and FIGURE, which only serve to illustrate the invention and do not limit it.

In the figures,

FIG. 1 shows a graphical representation of the DSC/TG curves of the fibers of Example 1 with varying aluminum content.

EXAMPLES

Example 1

Increasing the Recrystallization Resistance/Increasing the Operating Temperature An important feature of a high temperature resistant fiber is naturally the maximum operating temperature. In this connection, the melting range of the material is generally not the crucial factor, but the temperature at which the material loses its fiber-specific properties. A good measure for this is the tensile strength of a fiber. If it goes towards zero, one can no longer speak of a fiber material. The example below is supposed to demonstrate how the tensile strength of a single fiber can be affected by the aluminum content, which is predetermined by the raw glass used and dependant on the production process. In the chemical compositions below, water bound in the structure is disregarded.

A glass batch consisting of 67% by weight of $SiO_2$, 6.8% by weight of $Al_2O_3$, 25.2% by weight of $Na_2O$, and 1.0% by weight of further components is heated in a Pt—Rh bushing until it is liquefied. The glass filaments discharging from the orifices at the bottom side of the bushing are taken up by a rotating drum, drawn by a winder axially to the drum, and wound up. These spools are subsequently thoroughly rinsed with 20% hydrochloric acid for about 8 hours at a temperature of at least 40° C. (more preferably 60° C.). Subsequently, the salt produced by the reaction and the residual acid are removed from the fibers by several rinsing operations with cold water (room temperature). The spools are allowed to drain, and subsequently dried for 24 h with hot air of at least 70° C. until the weight remains constant. After this process, the obtained fiber (F1) had the following chemical composition: 90.6% by weight of $SiO_2$, 8.7% by weight of $Al_2O_3$, 0.2% by weight of $Na_2O$, 0.5% by weight of further components.

To measure the change in structure of the solid as a function of temperature (recrystallization), the fiber was subjected to a DSC/TG (differential scanning calorimetry/thermogravimetry) measurement (FIG. 1).

To demonstrate the difference in the change in structure as a function of the aluminum content, a second comparative glass mixture corresponding to the earlier patent EP 0 973 697 was converted into fiber material under the same conditions. The starting glass composition comprised 72% by weight of $SiO_2$, 3.5% by weight of $Al_2O_3$, 24% by weight of $Na_2O$, and 0.5% by weight of further components. The final composition of the fiber (F2) resulting from it after the ion exchange process was the following: 95.1% by weight of $SiO_2$, 4.2% by weight of $Al_2O_3$, 0.15% by weight of $Na_2O$, and 0.55% by weight of further components. The DSC/TG curve of this fiber is also shown in FIG. 1.

FIG. 1 shows the DSC/TG curves of Silex® fibers having different aluminum content (F1: 90.6% by weight of $SiO_2$, 8.7% by weight of $Al_2O_3$, 0.2% by weight of $Na_2O$, 0.5% by weight of further components; F2: 95.1% by weight of $SiO_2$, 4.2% by weight of $Al_2O_3$, 0.15% by weight of $Na_2O$, and 0.55% by weight of further components).

The differing degree of recrystallization tendency of the fibers can be easily recognized. While F2 loses strength starting at 750° C. by continuous devitrification (exothermic process), this process only starts at about 1000° C. with F1. Both fiber types show a predominantly endothermic behavior due to evaporation of physically bound water up to 180° C. In the range of 200° C.-800° C., further chemically bound water is removed from the structure (endothermic), and new Si—O—Si bonds are formed (exothermic). The mass loss of about 15% of water is approximately the same in both fibrous materials.

Due to the later start by 200° C. of the structural modification of the amorphous network, the fiber-defined mechanical fiber properties such as for example tensile strengths could be shifted to higher temperature regions (see Table 2 below). The tensile strengths were measured on monofilaments in accordance with the method of DIN EN 1007-4 (2004).

TABLE 2

Chart of Tensile Strengths of Monofilaments after Temperature Treatment

| Tensile strength [MPa] | 20° C. | 1000° C. | 1100° C. | 1200° C. | 1250° C. |
|---|---|---|---|---|---|
| F1 | 760 | 520 | 470 | 250 | 150 |
| F2 | 720 | 470 | 150 | 0 | 0 |

Example 2

Increasing the Tensile Strength with the Same Operating Temperature/Yarns and Twisted Yarns with Higher Tensile Strengths and Flexibility of the Fiber Above 800° C. (Use as Mounting Mat in Emission Control Systems of the Automobile and Commercial Vehicle Industry)

The diameter-dependent tensile strength, elongation and modulus of elasticity of a filament fiber considerably affect the total tensile strength of a yarn or twisted yarn. The example below shows the dependence of the tensile strength on aluminum content and operating temperature. In the specifications below regarding the chemical compositions, water bound in the structure is disregarded.

A glass batch consisting of 66% by weight of $SiO_2$, 5.3% by weight of $Al_2O_3$, 24% by weight of $Na_2O$, 3.8% by weight of $ZrO_2$, and 0.9% by weight of further components is heated in a Pt—Rh bushing until it is liquefied. The glass filaments discharging from the orifices at the bottom side of the bushing are taken up using a rotating drum, drawn by a winder axially to the drum, and wound up. These spools are subsequently thoroughly rinsed with 18% hydrochloric acid for about 12 hours at a temperature of at least 40° C. (more preferably 60° C.). Subsequently, the salt produced by the reaction and the residual acid are removed from the fibers by several rinsing operations with deionized cold water (room temperature). The spools are allowed to drain, and subsequently dried for 24 h with hot air of at least 70° C. until the weight remains constant. After the ion exchange process, the obtained fiber (F3) had the following chemical composition: 82.8% by weight of $SiO_2$, 8.9% by weight of $Al_2O_3$, 0.8% by weight of $Na_2O$, 5.7% by weight of $ZrO_2$, and 1.5% by weight of further components. In comparison to this, comparative fiber F2 from Example 1 was measured with aluminum but without zirconium (see Table 3, Table 4, Table 5 below).

TABLE 3

Chart of Tensile Strengths of Monofilaments as a Function of Temperature

| Tensile strength [MPa] | 20° C. | 1000° C. | 1100° C. | 1200° C. |
|---|---|---|---|---|
| F3 | 490 | 560 | 680 | 0 |
| F2 | 720 | 470 | 150 | 0 |

TABLE 4

Chart of the E modulus of Monofilaments as a Function of Temperature

| E modulus [GPa] | 20° C. | 1000° C. | 1100° C. | 1200° C. |
|---|---|---|---|---|
| F3 | 21.29 | 48.58 | 52.96 | 0 |
| F2 | 30.27 | 33.32 | 37.11 | 0 |

TABLE 5

Chart of the Elongation of Monofilaments as a Function of Temperature

| Elongation [%] | 20° C. | 1100° C. |
|---|---|---|
| F3 | 2.40 | 1.21 |
| F2 | 2.50 | 0.47 |

All measurements were performed in accordance with the methods described in DIN EN 1007-4 (2004).

Example 2 shows that the fibers according to the invention have improved tensile strength, a better modulus of elasticity, and increased elongation compared to the comparative fibers.

The invention claimed is:

1. A high temperature resistant inorganic fiber based on silica, comprising:

81-94% by weight of $SiO_2$
6-19% by weight of $Al_2O_3$
2-12% by weight of $ZrO_2$ or 2-12% by weight of $TiO_2$
0-3% by weight of $Na_2O$
and a maximum of 1.5% by weight of further components.

2. A high temperature resistant inorganic fiber based on silica according to claim 1, said further components are selected from the group consisting of $Li_2O$, $K_2O$, CaO, MgO, SrO, BaO, $Y_2O_3$, $La_2O_3$, $Fe_2O_3$, and mixtures thereof.

3. A high temperature resistant inorganic fiber based on silica according to claim 1 or claim 2, wherein said fiber comprises about 6-13% by weight of $Al_2O_3$.

4. A high temperature resistant inorganic fiber based on silica according to claim 1, wherein said fiber comprises about 2-9% by weight of $ZrO_2$.

5. A high temperature resistant inorganic fiber based on silica according to claim 1, wherein said fiber comprises about 0-2% by weight of $Na_2O$.

6. A high temperature resistant inorganic fiber based on silica according to claim 1, wherein said fiber is present in the form of filaments or staple fibers.

7. A high temperature resistant inorganic fiber based on silica, according to claim 1, wherein said fiber can be obtained by acid extraction of a glass composition having the following composition:

55-80% by weight of $SiO_2$
5-19% by weight of $Al_2O_3$
15-26% by weight of $Na_2O$
0-12% by weight of $ZrO_2$
0-12% by weight of $TiO_2$
and a maximum of 1.5% by weight of further components.

8. A process for producing high temperature resistant inorganic fibers based on silica according to claim 1, comprising:

a) melting a starting glass composition having the following composition:
55-80% by weight of $SiO_2$
5-19% by weight of $Al_2O_3$
15-26% by weight of $Na_2O$
0-12% by weight of $ZrO_2$
0-12% by weight of $TiO_2$
and a maximum of 1.5% by weight of further components;
b) forming filaments or staple fibers from the melt;
c) acid extraction of the filaments or staple fibers;
d) rinsing the extracted filaments or staple fibers to remove residual acid and/or salt residues; and
e) drying the filaments or staple fibers obtained.

9. A process for producing high temperature resistant inorganic fibers based on silica according to claim 8, wherein said acid extraction is performed with an inorganic acid, or with an organic acid.

10. A process for producing high temperature resistant inorganic fibers based on silica according to claim 8 or claim 9, wherein said acid extraction is performed at a temperature of about 35-80° C. and for a period of at least six hours.

11. A fiber product of a high temperature resistant inorganic fiber based on silica obtained by a process according to claim 8.

12. A fiber product of a high temperature resistant inorganic fiber based on silica according to claim 11, said fiber product is selected from the group consisting of staple fibers, high tensile strength yams, twisted yarns, nonwovens, woven fabrics, webs, ribbons, packages, and knitted fabrics.

13. A fiber product of a high temperature resistant inorganic fiber based on silica according to claim 11 or claim 12, wherein said fiber product is selected from the group consisting of mounting mats for the automobile and commercial vehicle industry, products for furnace construction, products for the fire protection industry, and personal protective equipment.

14. A high temperature resistant inorganic fiber based on silica according to claim 1, wherein said fiber comprises about 8-13% by weight of $Al_2O_3$.

15. A high temperature resistant inorganic fiber based on silica according to claim 4, wherein said fiber comprises about 8-11% by weight of $Al_2O_3$.

16. A high temperature resistant inorganic fiber based on silica according to claim 1, wherein said fiber comprises about 3-7% by weight of $ZrO_2$.

17. A high temperature resistant inorganic fiber based on silica according to claim 1, wherein said fiber comprises about 2-9% by weight of $TiO_2$.

18. A high temperature resistant inorganic fiber based on silica according to claim 1, wherein said fiber comprises about 3-7% by weight of $TiO_2$.

19. A high temperature resistant inorganic fiber based on silica according to claim 1, wherein said fiber comprises about 0-1% by weight of $Na_2O$.

20. A high temperature resistant inorganic fiber based on silica according to claim 1, wherein said fiber comprises about 0-0.5% by weight of $Na_2O$.

21. A process for producing high temperature resistant inorganic fibers based on silica according to claim 8, wherein said acid extraction is performed with an acid selected from the group consisting of acetic acid, formic acid, and oxalic acid.

22. A high temperature resistant inorganic fiber based on silica according to claim 1, wherein said fiber comprises 2-12% by weight of $ZrO_2$.

23. A high temperature resistant inorganic fiber based on silica according to claim 1, wherein said fiber comprises 2-12% by weight of $TiO_2$.

24. A high temperature resistant inorganic fiber based on silica according to claim 1, wherein said fiber comprises 2-12% by weight of $ZrO_2$ and 2-12% by weight of $TiO_2$.

* * * * *